(12) United States Patent
Kim et al.

(10) Patent No.: US 10,003,626 B2
(45) Date of Patent: Jun. 19, 2018

(54) ADAPTIVE REAL-TIME TRANSCODING METHOD AND STREAMING SERVER THEREFOR

(71) Applicant: INDUSTRY-ACADEMIC COOPERATION FOUNDATION, YONSEI UNIVERSITY, Seoul (KR)

(72) Inventors: Sung Ho Kim, Seongnam-si (KR); Keun Baek Park, Seongnam-si (KR); Joon Kee Chang, Seongnam-si (KR); Sung Tak Cho, Seongnam-si (KR); Won Woo Ro, Seongnam-si (KR); Doo Hwan Oh, Seongnam-si (KR); Keun Soo Kim, Seongnam-si (KR); Young Jae Cho, Seongnam-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 177 days.

(21) Appl. No.: 15/030,969

(22) PCT Filed: Oct. 22, 2014

(86) PCT No.: PCT/KR2014/009941
§ 371 (c)(1),
(2) Date: Apr. 21, 2016

(87) PCT Pub. No.: WO2015/060638
PCT Pub. Date: Apr. 30, 2015

(65) Prior Publication Data
US 2016/0269462 A1 Sep. 15, 2016

(30) Foreign Application Priority Data
Oct. 22, 2013 (KR) .................. 10-2013-0126142

(51) Int. Cl.
*G06F 15/173* (2006.01)
*H04L 29/06* (2006.01)
(Continued)

(52) U.S. Cl.
CPC ............ *H04L 65/607* (2013.01); *H04L 47/38* (2013.01); *H04L 65/4069* (2013.01);
(Continued)

(58) Field of Classification Search
USPC ................. 709/231, 242; 370/332; 345/425
See application file for complete search history.

(56) References Cited

U.S. PATENT DOCUMENTS 5,953,506 A * 9/1999 Kalra .................... G06T 3/4092
345/428
8,178,797 B2 * 5/2012 Bayer .................... G01G 21/30
177/132
(Continued)

FOREIGN PATENT DOCUMENTS

KR 10-2005-0051825 A 6/2005
KR 10-2007-0059053 A 6/2007
(Continued)

OTHER PUBLICATIONS

Korean Office Action for Korean Patent Application No. 10-2013-0126142, dated Dec. 23, 2014.
(Continued)

*Primary Examiner* — Tammy Nguyen
(74) *Attorney, Agent, or Firm* — Sughrue Mion, PLLC

(57) ABSTRACT

The present invention relates to an adaptive real-time transcoding method and a streaming server therefor to improve service quality by minimizing the disconnection of images in an environment, such as a mobile device, through adaptively changing a set value of a transcoding operation on a media streaming service to match a network environ-
(Continued)

ment. The adaptive real-time transcoding method of the present invention is a real-time transcoding method for sequentially transmitting a media data segment, divided and transcoded, in a streaming server to the client side over a network, the method comprising the steps of: determining the fill level of a client-side playback buffer; determining, on the basis of the fill level of the playback buffer, the image quality of media data segments that are not transmitted to the client side; and transcoding the non-transmitted media data segments according to the determined image quality.

15 Claims, 5 Drawing Sheets

(51) Int. Cl.
| | | |
|---|---|---|
| H04N 21/2343 | (2011.01) | |
| H04N 21/238 | (2011.01) | |
| H04N 21/24 | (2011.01) | |
| H04N 21/2662 | (2011.01) | |
| H04N 21/414 | (2011.01) | |
| H04N 21/647 | (2011.01) | |
| H04L 12/811 | (2013.01) | |
| H04N 21/234 | (2011.01) | |

(52) U.S. Cl.
CPC ........ *H04L 65/4084* (2013.01); *H04L 65/602* (2013.01); *H04L 65/80* (2013.01); *H04N 21/238* (2013.01); *H04N 21/2343* (2013.01); *H04N 21/23406* (2013.01); *H04N 21/2401* (2013.01); *H04N 21/2662* (2013.01); *H04N 21/41407* (2013.01); *H04N 21/64769* (2013.01)

(56) References Cited

U.S. PATENT DOCUMENTS

| | | | |
|---|---|---|---|
| 8,543,723 B2 | 9/2013 | Iwamura | |
| 8,611,524 B2* | 12/2013 | Meng | H04M 3/2227 379/265.01 |
| 8,718,797 B1* | 5/2014 | Addepalli | H04W 4/046 700/17 |
| 2001/0000138 A1 | 4/2001 | Bailleul | |
| 2006/0026295 A1 | 2/2006 | Iwamura | |
| 2008/0155120 A1* | 6/2008 | Argawal | H04L 67/104 709/242 |
| 2009/0259764 A1* | 10/2009 | Karlsson | H04L 65/4015 709/231 |
| 2014/0286316 A1* | 9/2014 | Park | H04W 76/16 370/332 |
| 2016/0308924 A1* | 10/2016 | Wei | H04L 43/00 |

FOREIGN PATENT DOCUMENTS

| | | |
|---|---|---|
| KR | 10-2013-0001169 A | 1/2013 |
| KR | 10-2013-0082689 A | 7/2013 |

OTHER PUBLICATIONS

International Search Report of PCT/KR2014/009941, dated Jan. 13, 2015. [PCT/ISA/210] English Translation.

Written Opinion of PCT/KR2014/009941, dated Jan. 13, 2015. [PCT/ISA/237].

* cited by examiner

ADAPTIVE REAL-TIME TRANSCODING METHOD AND STREAMING SERVER THEREFOR

CROSS REFERENCE TO RELATED APPLICATIONS

This application is a National Stage of International Application No. PCT/KR2014/009941, filed on Oct. 22, 2014, which claims priority from Korean Patent Application No. 10-2013-0126142, filed on Oct. 22, 2013, the contents of all of which are incorporated herein by reference in their entirety.

TECHNICAL FIELD

One or more example embodiments elate to a transcoding method for improving a quality of service (QoS) by reducing or, alternatively, minimizing disconnection of an image even in a mobile device and the like on a media streaming service that provides a multimedia image to a user terminal, and a streaming server for performing the transcoding method.

RELATED ART

A multimedia streaming service refers to a type of service that transmits a video file or an image source stored in a storage server to a plurality of user terminals (clients) to enable data reception and playback to be concurrently performed at a user terminal. This type of service has been widely recognized to be important with the recent development in mobile and cloud environments.

A streaming service technique may be an HTTP live streaming (HLS) technique, a real-time streaming protocol (RTSP) technique, and the like. The HLS technique is currently widely used in terms of using an existing web server, for example, an HTTP server, without great modification thereto and using a simple protocol.

Transcoding refers to converting a form, for example, a file format, a resolution, a quality, and the like, of multimedia content. In a streaming service, many multimedia files stored in a storage server are high quality and mass capacity files, which may be unsuitable for being transmitted to and being played back at a mobile terminal. Further, if a format of source content stored in the storage server is not supported by a client, a format conversion is to be performed.

In general, such transcoding requires vast operation resources. Thus, a server that provides a service to a plurality of clients is generally configured to pre-store a result file by executing pre-transcoding and to service the result file as necessary. However, with the distribution of techniques, such as cloud and the like, a user demand for a streaming service for multimedia files is currently on the increase. The diversification of a user terminal into, such as a tablet personal computer (PC), a smartphone, a smart television (TV), and the like, makes pre-transcoding difficult. Recently, in response to a user request, real-time transcoding that performs transcoding at the same time of executing streaming is enabled. The development in operation performance of a server has enabled the real-time transcoding.

In the case of a mobile device, a network state continuously varies due to a feature that a terminal is mobile. If a bitrate of an image being currently played back is less than a current network bandwidth, the continuous variation does not become an issue. On the contrary, if an available bandwidth is significantly reduced, for example, if handoff is performed from wireless fidelity (Wi-Fi) to third generation (3G), a streaming service cannot be provided without lowering a quality of the image. In this circumstance, if the image is transcoded in real time, the seamless service may be provided by detecting the circumstantial variation as above, by automatically encoding the image at a further low quality, and by reducing the bitrate.

The related art about transcoding may include Korean Patent Application No. 10-2011-0035112, Korean Patent Application No. 10-2012-0067789, and the like. The above arts are based on technology for determining a transcoding quality and the like based on a bandwidth and a performance of an encoding server, particularly, detecting a network bandwidth of a user terminal and changing a quality, for example, a bitrate of an image based on the detected network bandwidth.

A control method based on detection of a network bandwidth has many difficulties in practical aspects. In a system in which a client detects a bandwidth, a server needs to receive bandwidth information of the client to tune a quality, which may increase network traffic and load of the server. Also, the server may not accurately detect the bandwidth of the client because the server cannot verify an accurate timing at which transmission to the client is completed at an application level due to a buffer effect by network equipment, such as a router between the server and the client. To outperform the above issue, a special network protocol and replacement of software/hardware of the server and the client according thereto may be required. However, this method may not be readily selected on a service provider. Also, in terms of performance, the control method based on detection of the network bandwidth does not consider a client state and thus, may not reduce or, alternatively, minimize an image disconnection phenomenon at an actual client end.

DETAILED DESCRIPTION

Technical Subject

At least one example embodiment provides a method that may prevent an image disconnection phenomenon at a client end by adaptively changing a quality based on a network environment and may improve a quality of a streaming service by enabling a server to automatically determine an optimal quality.

At least one example embodiment also provides a method that enables a server to determine and estimate state of a playback buffer of a client and control an image quality based on the state of the playback buffer, instead of being based on detection of a bandwidth, thereby further effectively tuning a quality and preventing an image disconnection phenomenon at a client end although a bandwidth is detected inaccurately.

At least one example embodiment also provides a method that may effectively prevent an image disconnection phenomenon with a simple configuration instead of significantly modifying a configuration of hardware and software of an existing streaming server.

At least one example embodiment also provides a method that may effectively prevent an image disconnection phenomenon by enabling a server end to estimate a state of a playback buffer of a client end without affecting the client end, such as installing separate software, plug-in, and the like in the client end, or replacing the client end.

Other aspects and features, aside from the above aspects, may become apparent through the description related to example embodiments that refer to the accompanying drawings.

Technical Solution

An adaptive real-time transcoding method according to an aspect involves an adaptive real-time transcoding method for segmenting, at a streaming server, media data into media data segments, transcoding the media data segments, and sequentially transmitting the media data segments to a client end over a network, and includes determining a fill level of a playback buffer of the client end; determining a quality of a media data segment that is not transmitted to the client end, based on the fill level of the playback buffer; and transcoding the non-transmitted media data segment based on the determined quality.

As necessary, the adaptive real-time transcoding method may further include temporarily storing the segmented and transcoded media data segments in a transcoding buffer. The transcoding may include extracting a media data segment stored in the transcoding buffer; and re-transcoding the extracted media data segment based on the determined quality.

An adaptive real-time transcoding method according to another aspect includes segmenting, at a streaming server, media data into media data segments and transcoding the media data segments; and sequentially transmitting, at the stream server, the media data segment to a client end over a network, wherein a quality of each of the media data segments is tuned in real time at the streaming server based on a fill level of a playback buffer of the client end.

As necessary, each of the media data segments may include a playback time and quality data in a header as metadata, and the quality data may include information about the real-time tuned quality.

Also, the fill level of the playback buffer may be a reference value used at the streaming server to estimate whether the playback buffer is empty or whether the playback buffer becomes to be empty after a preset period of time is elapsed.

Also, the streaming server may compare a sum of playback times of transmitted media data segments to an elapse time from a streaming start time.

Also, in response to the sum of playback times of transmitted media data segments being detected to be less than or equal to the elapse time from the streaming start time, the streaming server may transcode the media data segment at a quality lower than the quality of the transmitted media data segment.

Also, in response to the sum of playback times of transmitted media data segments being greater than the elapse time of the streaming start time, the streaming server may alter a tuning ratio of each quality based on an additional elapse time from a point in time at which the sum of playback times of transmitted media data segments is detected to be less than or equal to the streaming start time.

Also, the streaming server may finely tune the quality in response to the additional elapse time being greater than a threshold reference, and may tune the quality at a relatively high tuning ratio in response to the additional elapse time being less than the threshold reference.

A streaming server according to still another aspect is a streaming server for sequentially transmitting media data segments to a playback buffer of a client end for a streaming service, and includes a playback buffer estimator configured to determine a fill level of the playback buffer of the client end; a quality controller configured to determine a quality of a media data segment that is not transmitted to the client end, based on the fill level of the playback buffer; and a transcoder configured to transcode the non-transmitted media data segment based on the determined quality.

As necessary, the streaming server may further include a transcoding buffer configured to temporarily store the media data segments corresponding to a transcoding result of the transcoding. The transcoder may be configured to extract a media data segment stored in the transcoding buffer, and to re-transcode the extracted media data segment based on the determined quality.

Also, the fill level of the playback buffer may be a reference value used at the streaming server to estimate whether the playback buffer is empty or whether the playback buffer becomes to be empty after a preset period of time is elapsed.

Also, the streaming server may be configured to compare a sum of playback times of transmitted media data segments to an elapse time from a streaming start time.

Effect of Invention

According to example embodiments, it is possible to prevent an image disconnection phenomenon at a client end by adaptively changing a quality based on a network environment and to improve a quality of a streaming service by enabling a server to automatically determine an optimal quality.

Also, according to example embodiments, a server may determine and estimate a state of a playback buffer of a client and control an image quality based on the state of the playback buffer, instead of being based on detection of a bandwidth. Thus, although a bandwidth is detected inaccurately, it is possible to further effectively tune a quality and prevent an image disconnection phenomenon at a client end.

Also, according to example embodiments, there is provided a method that may effectively prevent an image disconnection phenomenon with a simple configuration instead of significantly modifying a configuration of hardware and software of an existing streaming server.

Also, according to example embodiments, there is provided a method that may effectively prevent an image disconnection phenomenon by enabling a server end to estimate a state of a playback buffer of a client end without affecting the client end, such as installing separate software, plug-in, and the like in the client end, or replacing the client end.

BEST MODE

Hereinafter, example embodiments will be described with reference to the accompanying drawings and matters disclosed therein, however, the technical spirit of the present disclosure is not limited thereto or restricted thereby.

In general, a transfer technique using hypertext transfer protocol (HTTP) that is a web approach standard protocol is widely used as a video streaming server technique. In this trend, HTTP adaptive streaming is proposed. This HTTP adaptive streaming provides a service with changing a quality of a video service based on an actual communication bandwidth of a client connected to a streaming server. The HTTP streaming technique may include, for example, an HTTP live streaming (HLS) technique of Apple, an HTTP dynamic streaming technique of Adobe, and the like.

Hereinafter, for clarity of description, a streaming service is described based on the HLS technique. However, other streaming techniques have a basically similar structure and thus, the technique of the example embodiments may be provided only as an example and may be generally applicable to the other streaming techniques.

Figure 1:
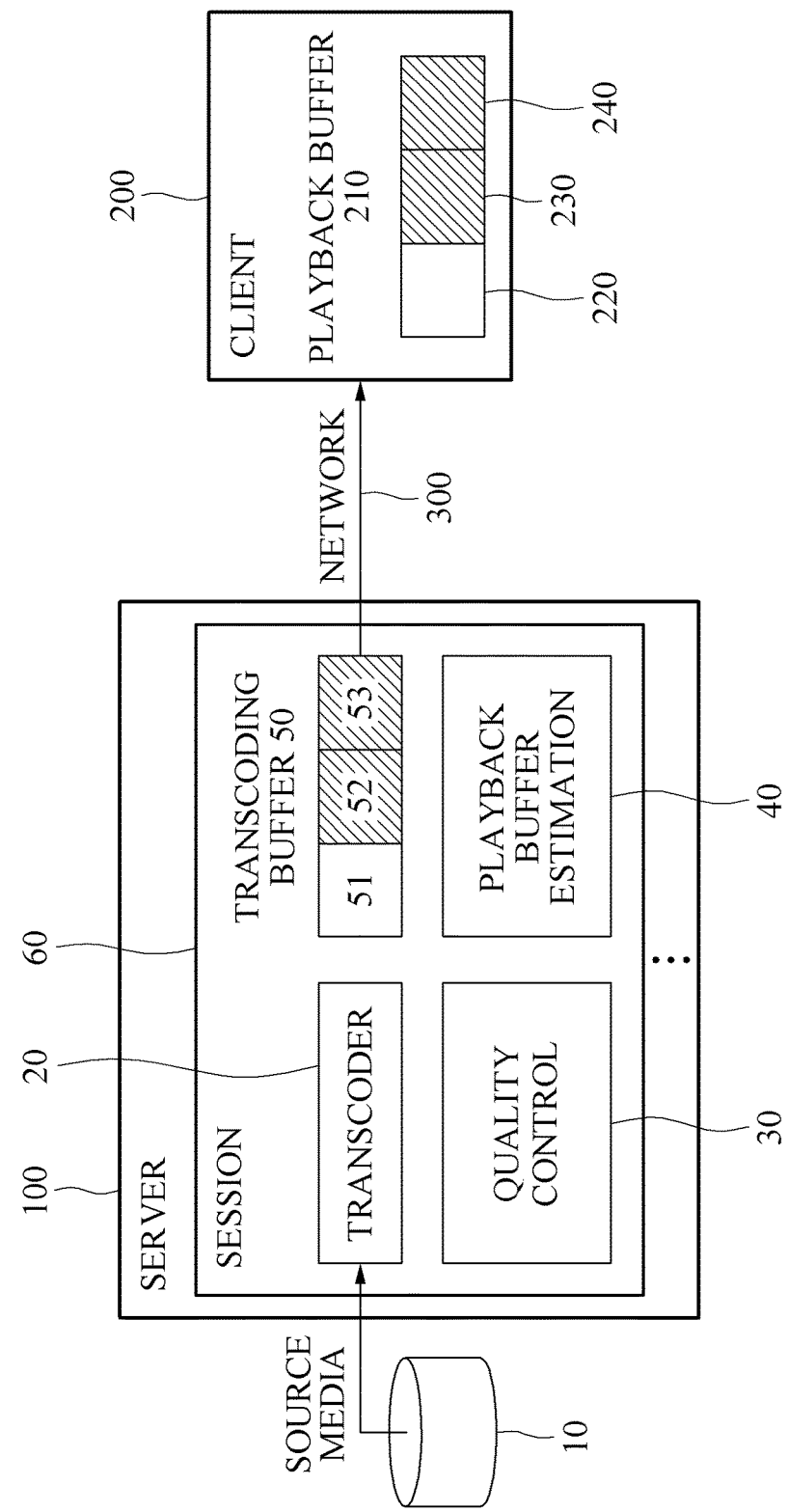
FIG. 1 is a diagram illustrating a streaming service providing environment including a streaming server, a client end, and source media according to an example embodiment.

FIG. 1 is a diagram illustrating a streaming service providing environment including a steaming server, a client end, and source media according to an example embodiment.

A streaming server 100 according to the example embodiment connects to a client end 200 over a network 300, such as a wired network, a wireless network, and the like, and interacts with a database 10 that stores and manages source media data.

Here, the network 300 includes a mobile communication network, such as wireless code division multiple access (WCDMA), HDPA, 3G, 4G, etc., a near field communication network, such as Bluetooth, ZigBee, wireless fidelity (Wi-Fi), etc., and a wired communication network, such as Internet, public switched telephone network (PSTN), etc.

Also, the database 10 that stores the source media data may be a cloud media server and may be a separate storage. Contents constituting the source media data may be provided from a variety of sources over the network. For example, the variety of sources may include a media server that stores media files, a 3G camera, an IP camera, an analog camera, a PC, a storage server, a laptop computer, a smartphone, a web hard, and the like. Also, the variety of sources may include a set-top box or a camera that provides a live stream, a hardware encoder that compresses a video signal to a digital signal, a PC, a smartphone, a tablet PC, etc.

The streaming server 100 according to the example embodiment is configured to sequentially transmit segments 51, 52, and 53 of media data to a playback buffer 210 of the client end 200 for a streaming service. The streaming server 100 includes a playback buffer estimator 40 configured to determine a fill level of the playback buffer 210 of the client end 200, a quality controller 30 configured to determine a quality of a media data segment that is not transmitted to the client end 200, based on the fill level of the playback buffer 210, a transcoder 20 configured to transcode the non-transmitted media data segment based on the determined quality, and a transcoding buffer 50 configured to sequentially store media data segments, for example, the segments 52 and 53, corresponding to a transcoding result.

The transcoder 20 may convert a plurality of contents, such as a live stream, a media file, and the like, to a format optimal for decoding information of a plurality of client ends 200 in real time.

The playback buffer 210 is provided to the client end 200 that is connected to the streaming server 100 through a streaming session. The playback buffer 210 is configured to store subsequent media data segments 230 and 240 to be played hack. If the playback buffer 210 becomes empty or enters into an almost empty state, some issues, such as playback disconnection, may arise.

The streaming server 100 records metadata including a quality and a playback time of media data segments stored in the transcoding buffer 50, a transmission start time, and a transmission end time in the playback buffer estimator 40 every time a transmission of each media data segment is completed.

Figure 2:
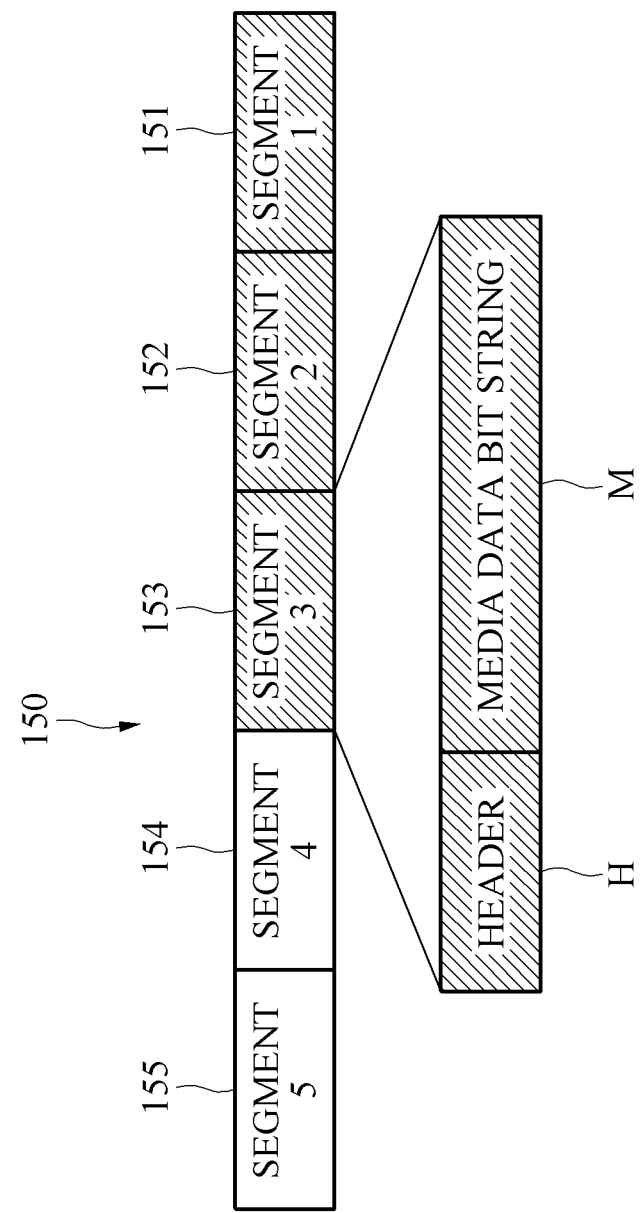
FIG. 2 illustrates a format of a media data segment and a transcoding buffer according to an example embodiment.

FIG. 2 illustrates a format of media data segments 151, 152, and 153 and a transcoding buffer 150 according to an example embodiment.

Referring to FIG. 2, the transcoding buffer 150 may temporarily store the media data segments 151, 152, and 153 corresponding to a coding result of the transcoder 20 of FIG. 1. Each of the media data segments 151, 152, and 153 may include a header H for recording metadata, such as an index, a playback time, a quality, etc., of each segment, and a media data bit string M corresponding to compressed content data of each segment.

Each segment may concurrently include image data and sound data. The image data may include a key frame that contains all of information of a corresponding frame and a compression frame that stores only a variation amount by referring to the key frame to enhance a compression efficiency. The compression frame cannot be decoded without the key frame to refer to. Thus, for smooth playback, each segment may store image data using the key frame and a group of pictures (GOP) that is a group unit of compression frames that refer to the respective corresponding key frames. That is, a single segment may include one or more GOP.

Figure 3:
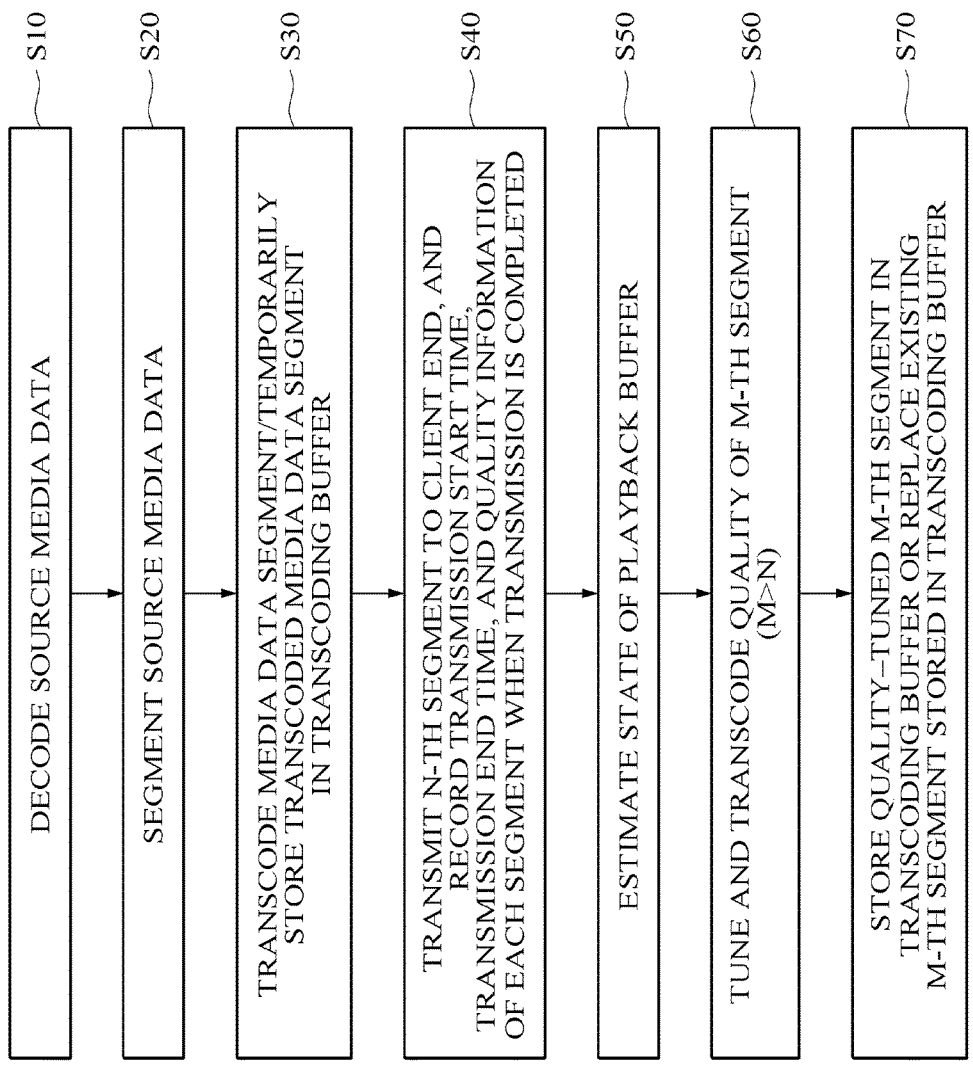
FIG. 3 is a flowchart illustrating an adaptive real-time transcoding method according to an example embodiment.

FIG. 3 is a flowchart illustrating an adaptive real-time transcoding method according to an example embodiment.

In response to a request for a streaming service from the client end 200, the streaming server 100 generates a session for identifying each user. In response to the request, the streaming server 100 receives and decodes source media data from various types of storages, such as the database 10 and the like, in operation S10.

The transcoder 20 segments a result image into an appropriate size of segments in operation S20, transcodes each segment, and temporarily stores the transcoded segment in the transcoding buffer 50 in operation S30. Meanwhile, during this process, the transcoder 20 may transcode the entire decoded source media data and then segment and store the transcoded source media data into segments.

The streaming server 100 transmits each of the media data segments to the client end 200, and the client end 200 stores the received media data segment in the playback buffer 210. Every time transmission of each segment, for example, a n-th segment is completed, the streaming server 100 records a transmission start time, transmission end time, and information, for example, metadata including a playback time, a quality, etc., of each segment in the playback buffer estimator 40 in operation S40.

Once an appropriate number of media data segments are received at the playback buffer 210, the client end 200 decodes the received media data segments and plays back the decoded media data segments. If the playback buffer 210 enters into an empty state due to a plurality of reasons, playback may be temporality suspended, which may be prevented through the example embodiment disclosed herein.

Every time transmission of each media data segment is completed, the playback buffer estimator 40 of the steaming server 100 estimates a buffer state of the client end 200 in operation S50. Here, an operation point in time of the playback buffer estimator 40 may be appropriately adjusted based on a transmission point in time of each media data segment. Also, the playback buffer estimator 40 may be set to operate when transmission of the number of media data segments required to initiate playback at the client end 200 is completed.

In operation 370, the transcoder 20 performs transcoding by tuning a quality of a media data segment, for example, an m-th segment (where m>n) to be transmitted based on the estimated state of the playback buffer 210. The transcoder 20 stores the quality-tuned media data segment in the transcoding buffer 50. Here, if a corresponding order of a media data segment is transcoded and stored in the transcoding buffer 50, the stored media data segment may be removed and be replaced with the quality-tuned media data segment in operation S80.

Figure 4:
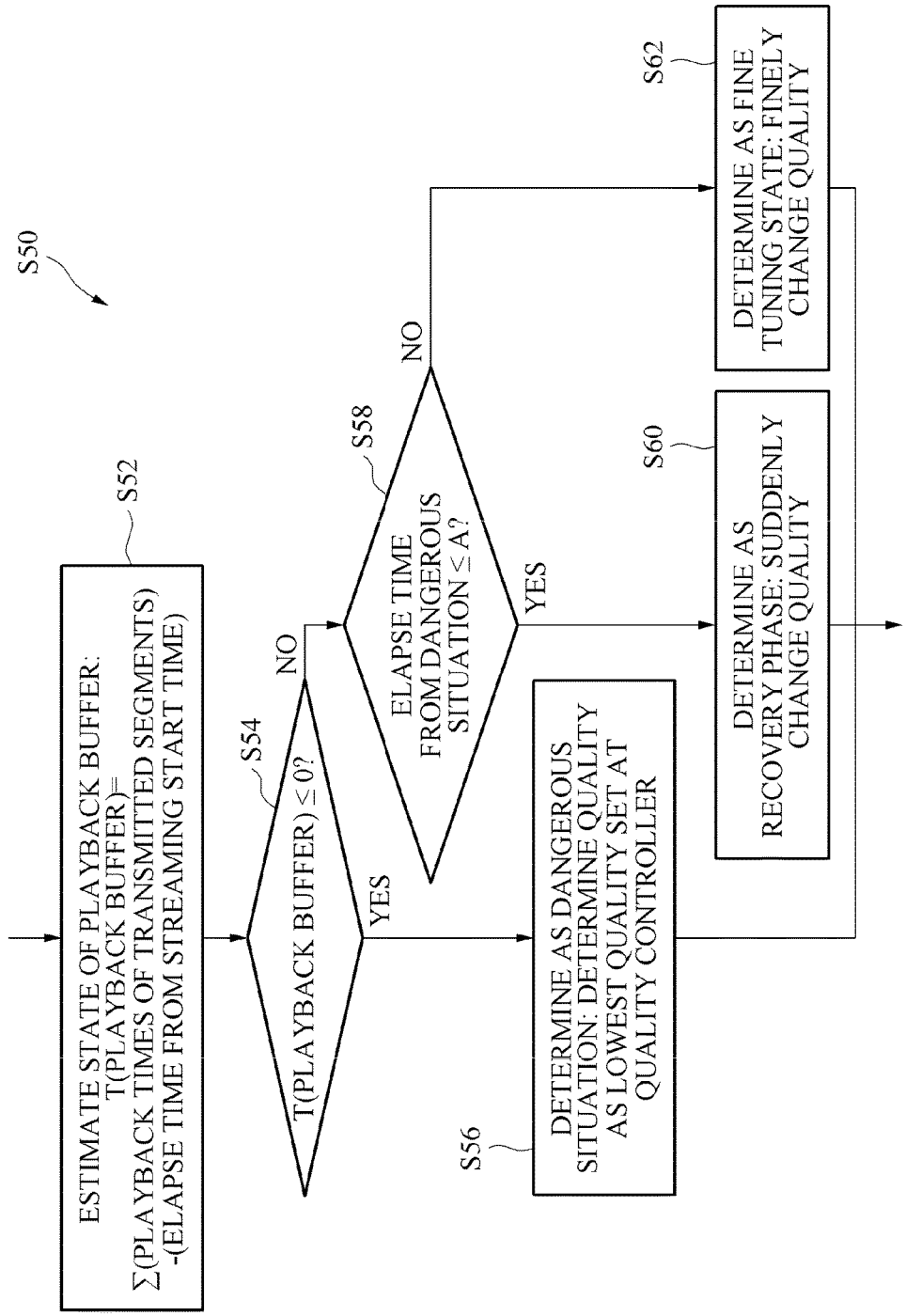
FIG. 4 is a flowchart illustrating an example of an estimation algorithm for estimating a state of a playback buffer in an adaptive real-time transcoding method according to an example embodiment.

FIG. 4 is a flowchart illustrating an example of an estimation algorithm for estimating a state of a playback buffer in an adaptive real-time transcoding method according to an example embodiment.

For example, in operation S52, the playback buffer estimator 40 may define a parameter indicating a state of the playback buffer and may perform determination based on the parameter. For example, the playback buffer estimator 40 may define a parameter 'T(playback buffer)' as expressed by Equation 1.

$$T(\text{playback buffer})=S(\text{playback times of transmitted segments})-(\text{elapse time from streaming start time}) \quad <\text{Equation 1}>$$

That is, the playback buffer estimator 40 may define a value acquired by deducting the elapse time of the streaming start time from the sum of playback times of transmitted segments as a value of the parameter 'T(playback buffer)', and may estimate a state of the playback buffer based on the parameter value.

In operation S54, the playback buffer estimator 40 determines whether the value of the parameter 'T(playback buffer)' is less than or equal to 0. If the value of the parameter is less than or equal to 0, the playback buffer estimator 40 determines it as a dangerous situation and sets the quality to be lowest within the available range set at the quality controller 30 in operation S56. During this process, the playback buffer estimator 40 may extract a segment currently stored in the transcoding buffer 50 and transcode a quality of the extracted segment to a lowest quality.

Conversely, if the value of the parameter 'T(playback buffer)' is greater than 0, the playback buffer estimator 40 may tune the quality based on an elapse time from the dangerous situation, for example, a situation in which the parameter value is less than or equal to 0. For example, unless a preset amount of time α is elapsed from the dangerous situation in operation S58, the playback buffet 40 may determine a current phase as a recovery phase and suddenly change the quality or a bitrate in operation S60. In this case, an exponential tuning algorithm that multiplies or divides specific multiples may be employed. On the contrary, if the preset amount of time α is elapsed, the playback buffer estimator 40 may finely tune the quality or the bitrate in operation S62. In this case, specific constant may be added deducted.

Figure 5:
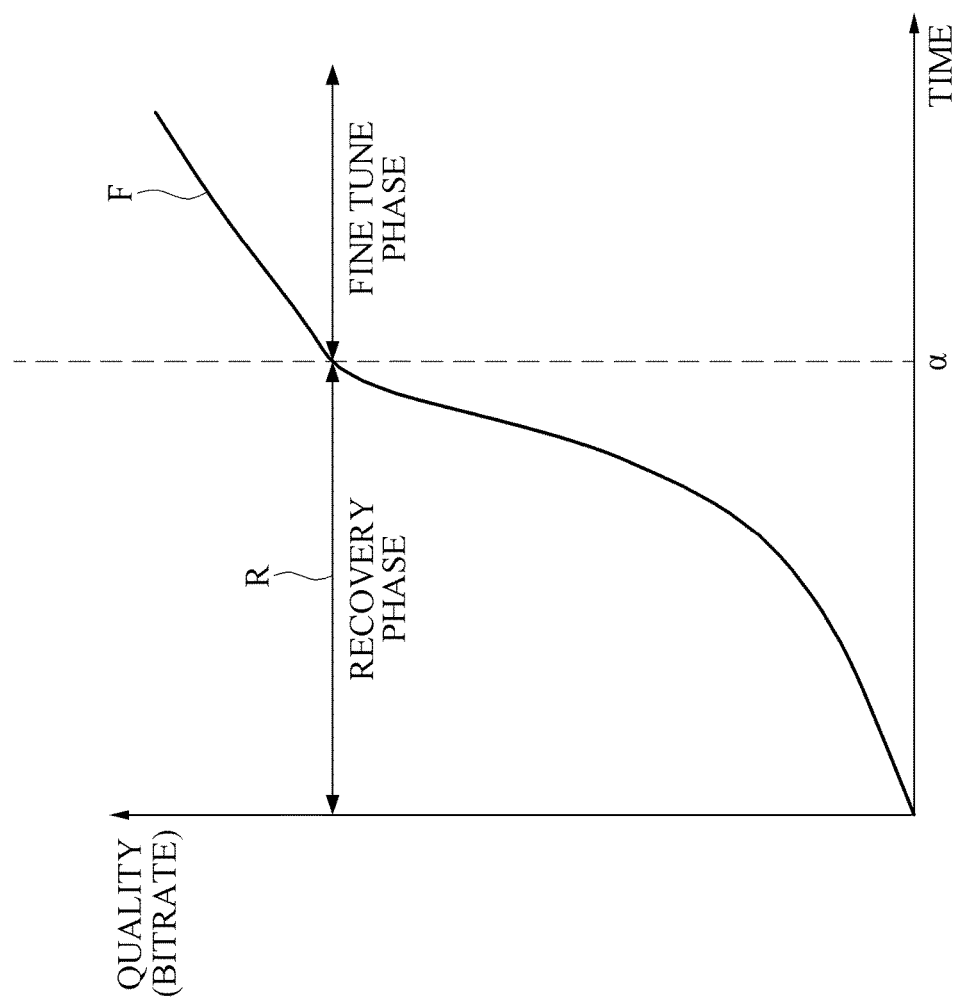
FIG. 5 illustrates an example of a diagram for classifying and controlling a quality for each section based on a playback buffer state estimation parameter in an adaptive realtime transcoding method according to an example embodiment.

FIG. 5 illustrates an example of a diagram for classifying and controlling a quality for each section based on a playback buffer state estimation parameter in an adaptive real-time transcoding method according to an example embodiment.

Referring to FIG. 5 regarding tuning the quality based on the value of the parameter 'T(playback buffer)', a parameter value increases in a section corresponding to the preset value α or less. Thus, the parameter value may be tuned to significantly increase by applying the exponential tuning algorithm or by applying a linear tuning method based on a high tilt as another example.

The parameter value increases in a section beyond the preset value α. Thus, a linear tuning method based on a low tilt or a method of adding or deducting a specific constant may be applied.

In detail, a quality tuning level to be performed may be variously modified based on a policy of a service provider. As one example, the aforementioned method may be applicable to a policy of maintaining 'T(playback buffer)' at a constant time. For example, if a goal value for 'T(playback buffer)' according to a service policy is represented as P, an error value E from the goal may be defined as expressed by Equation 2.

$$E=T(\text{playback buffer})-P \quad <\text{Equation 2}>$$

In this case, a method of applying different two variation amounts to a current quality value to be proportional to the error value E based on the preset value α may be applicable as expressed by Equation 3.

<Equation 3>

If $T(\text{playback buffer})<\alpha$: A new quality is set to $Q=Q+H*E$ by applying high tilt $H$ to current quality $Q$.      1.

If $T(\text{playback buffer})=\alpha$: A new quality is set to $Q=Q+L*E$ by applying low tilt $L$ to current quality $Q$.      2.

The servers or apparatuses described herein may be implemented using hardware components, software components, or a combination thereof. For example, the apparatuses and constituent elements according to the example embodiments may be configured using one or more general-purpose or special purpose computers, such as, for example, a processor, a controller and an arithmetic logic unit (ALG), a digital signal processor, a microcomputer, a field programmable array (FPGA), a programmable logic unit (PUL), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments or vice versa.

Although a few example embodiments have been shown and described, the present disclosure is not limited to the described example embodiments and the accompanying drawings. Instead, it would be appreciated by those skilled in the art that various changes and modifications may be made to these example embodiments without departing from the principles and spirit of the invention, the scope of which is defined by the claims and their equivalents.

What is claimed is:

1. An adaptive real-time transcoding method for segmenting, at a streaming server, media data into media data segments, transcoding the media data segments, and sequentially transmitting the media data segments to a client end over a network, the method comprising:
   determining a fill level of a playback buffer of the client end by comparing a sum of playback times of transmitted media data segments with an elapse time from a streaming start time;
   determining a quality of a media data segment that is not transmitted to the client end, based on the fill level of the playback buffer; and
   transcoding the non-transmitted media data segment based on the determined quality.

2. The method of claim 1, further comprising:
   temporarily storing the segmented and transcoded media data segments in a transcoding buffer,
   wherein the transcoding comprises:
   extracting a media data segment stored in the transcoding buffer; and
   re-transcoding the extracted media data segment based on the determined quality.

3. An adaptive real-time transcoding method comprising:
   segmenting, at a streaming server, media data into media data segments and transcoding the media data segments; and
   sequentially transmitting, at the stream server, the media data segments to a client end over a network,
   wherein a quality of each of the media data segments is tuned in real time at the streaming server based on a fill level of a playback buffer of the client end, and
   wherein the fill level of the playback buffer is determined by comparing a sum of playback times of transmitted data segments with an elapse dine from a streaming start time.

4. The method of claim 3, wherein each of the media data segments includes a playback time and quality data in a header as metadata, and
   the quality data includes information about the real-time tuned quality.

5. The method according to claim 1, wherein the fill level of the playback buffer is a reference value used at the streaming server to estimate whether the playback buffer is empty or whether the playback buffer becomes to be empty after a preset period of time is elapsed.

6. The method of claim 1, wherein, in response to the sum of playback times of transmitted media data segments being detected to be less than or equal to the elapse time from the streaming start time, the streaming server transcodes the media data segment at a quality lower than the quality of the transmitted media data segment.

7. The method of claim 1, wherein, in response to the sum of playback times of transmitted media data segments being greater than the elapse time of the streaming start time, the streaming server alters a tuning ratio of each quality based on an additional elapse time from a point in time at which the sum of playback times of transmitted media data segments is detected to be less than or equal to the streaming start time.

8. The method of claim 7, wherein the streaming server finely tunes the quality in response to the additional elapse time being greater than a threshold reference, and tunes the quality at a relatively high tuning ratio in response to the additional elapse time being less than the threshold reference.

9. A streaming server for sequentially transmitting media data segments to a playback buffer of a client end for a streaming service, the streaming server comprising:
   a playback buffer estimator configured to determine a fill level of the playback buffer of the client end by comparing a sum of playback times of transmitted media data segments with an elapse time from a streaming start time;
   a quality controller configured to determine a quality of a media data segment that is not transmitted to the client end, based on the fill level of the playback buffer; and
   a transcoder configured to transcode the non-transmitted media data segment based on the determined quality.

10. The streaming server of claim 9, further comprising:
    a transcoding buffer configured to temporarily store media data segments corresponding to a transcoding result of the transcoder,
    wherein the transcoder is configured to extract a media data segment stored in the transcoding buffer, and to re-transcode the extracted media data segment based on the determined quality.

11. The streaming server of claim 9, wherein the fill level of the playback buffer is a reference value used at the streaming server to estimate whether the playback buffer is empty or whether the playback buffer becomes to be empty after a preset period of time is elapsed.

12. The method according to claim 3, wherein the fill level of the playback buffer is a reference value used at the streaming server to estimate whether the playback buffer is empty or whether the playback buffer becomes to be empty after a preset period of time is elapsed.

13. The method of claim 3, wherein, in response to the sum of playback times of transmitted media data segments being detected to be less than or equal to the elapse time from the streaming start time, the streaming server transcodes the media data segment at a quality lower than the quality of the transmitted media data segment.

14. The method of claim 3, wherein, in response to the sum of playback times of transmitted media data segments being greater than the elapse time of the streaming start time, the streaming server alters a tuning ratio of each quality based on an additional elapse time from a point in time at which the sum of playback times of transmitted media data segments is detected to be less than or equal to the streaming start time.

15. The method of claim 14, wherein the streaming server finely tunes the quality in response to the additional elapse time being greater than a threshold reference, and tunes the quality at a relatively high tuning ratio in response to the additional elapse time being less than the threshold reference.

* * * * *